United States Patent
Hardin

(10) Patent No.: US 6,317,262 B1
(45) Date of Patent: Nov. 13, 2001

(54) TELESCOPE WITH AUXILIARY IMAGE GENERATOR

(75) Inventor: Larry C. Hardin, Bandon, OR (US)

(73) Assignee: Hardin Optical Co., Bandon, OR (US)

( * ) Notice: Subject to any disclaimer, the term of this patent is extended or adjusted under 35 U.S.C. 154(b) by 0 days.

(21) Appl. No.: 09/566,655

(22) Filed: May 8, 2000

(51) Int. Cl.[7] .................................................. G02B 23/00
(52) U.S. Cl. ........................................... 359/399; 359/400
(58) Field of Search ............................ 359/399, 363, 359/400, 362

(56) References Cited

U.S. PATENT DOCUMENTS

| | | | |
|---|---|---|---|
| 5,355,224 | * 10/1994 | Wallace | 359/631 |
| 5,579,165 | * 11/1996 | Michel et al. | 359/630 |
| 5,825,480 | * 10/1998 | Udegawa | 356/138 |
| 5,892,617 | * 4/1999 | Wallace | 359/353 |

* cited by examiner

*Primary Examiner*—Cassandra Spyrou
*Assistant Examiner*—Mark A. Robinson
(74) *Attorney, Agent, or Firm*—Chernoff, Vilhauer, McClung & Stenzel, LLP

(57) ABSTRACT

The present invention provides a telescope having a focal plane into which an image of a distant object is focused. It includes a primary mirror and a secondary mirror wherein the secondary mirror is positioned to cast a shadow on a portion of the primary mirror. A data image projecting device projects a data image from the portion of the primary mirror which lies in the shadow of the secondary mirror. The data image is focused in the focal plane of the telescope and is superimposed on the image of the distant object.

10 Claims, 6 Drawing Sheets

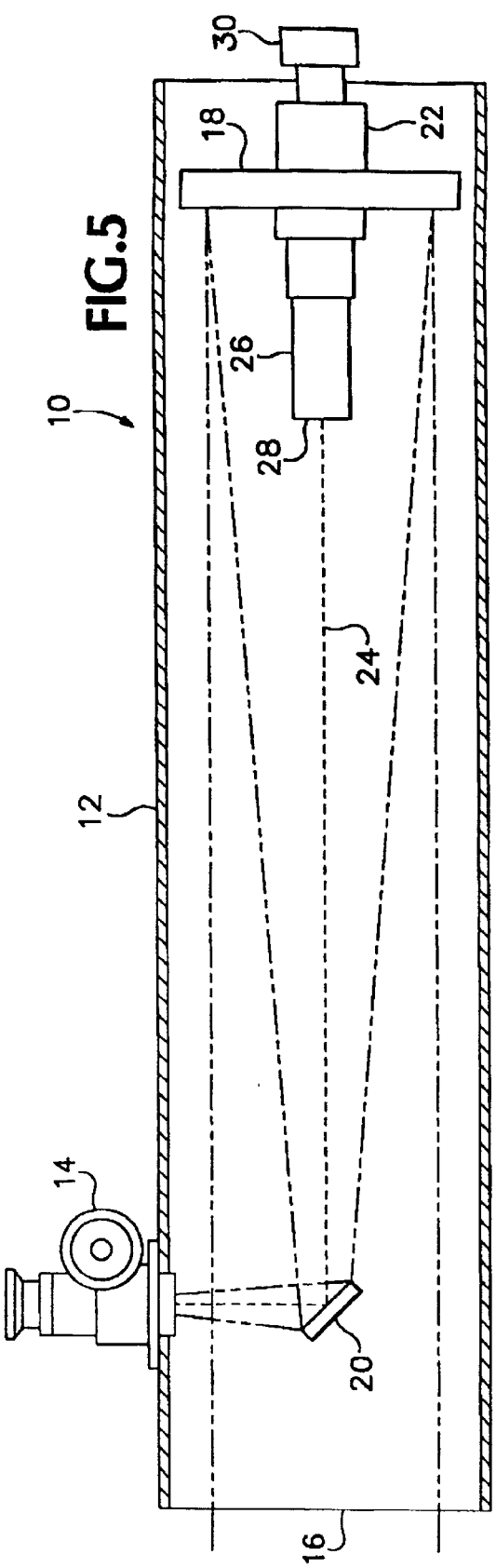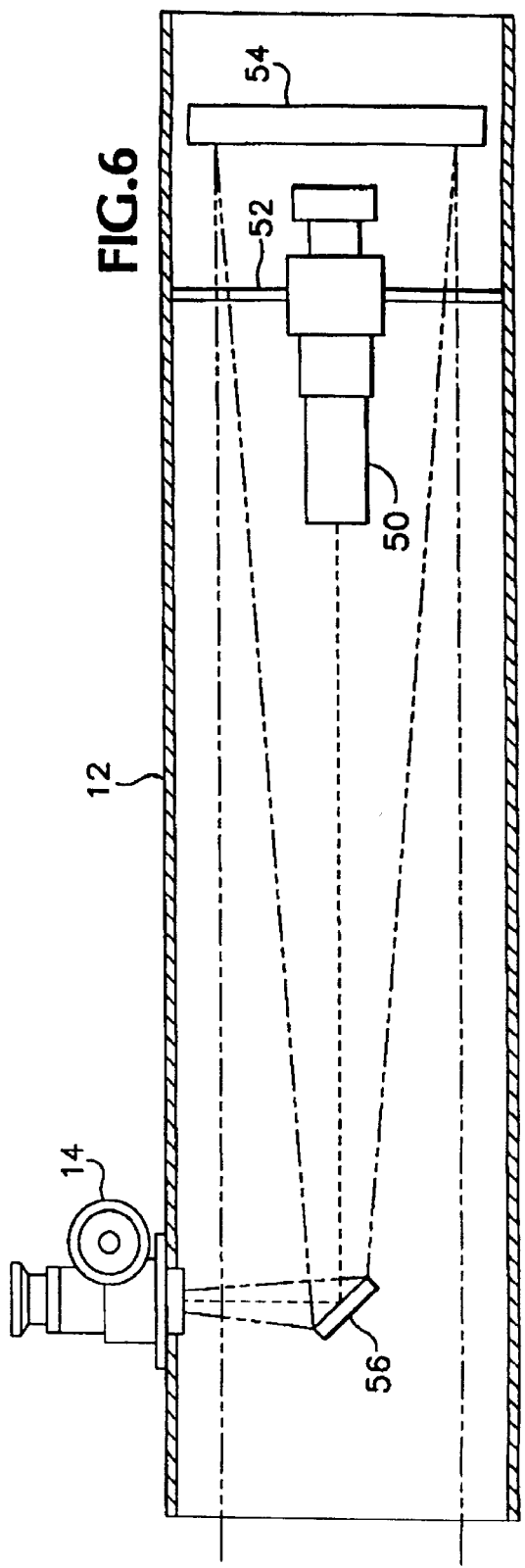

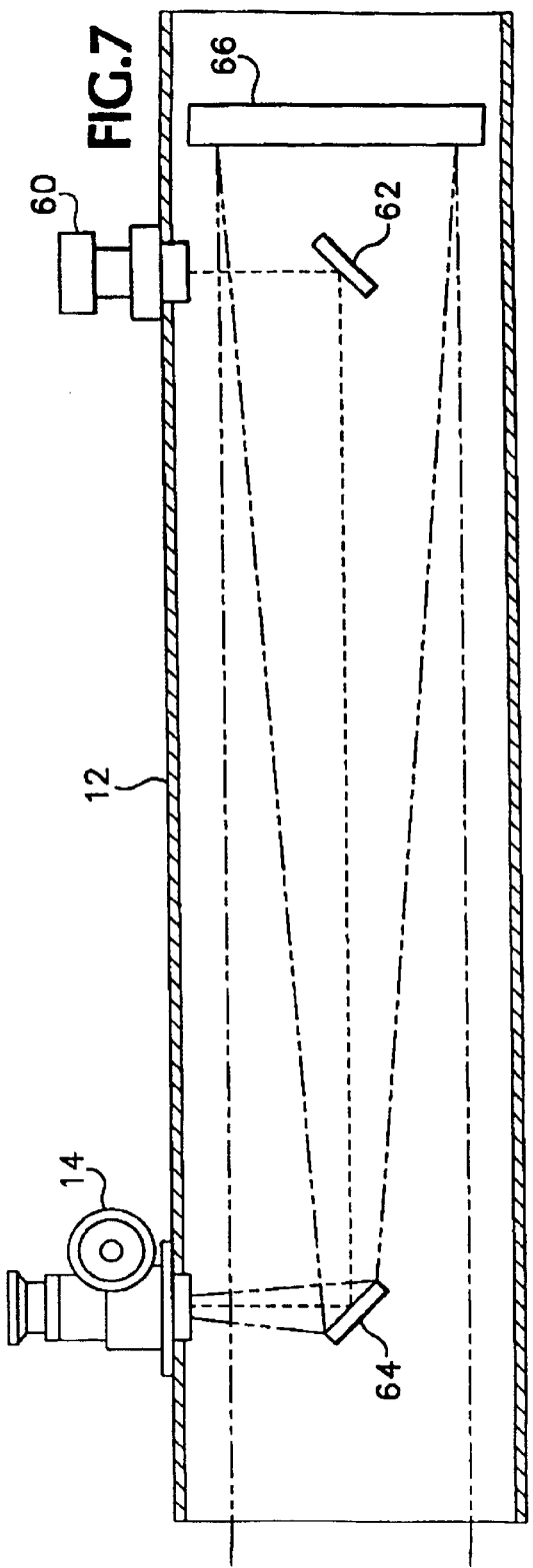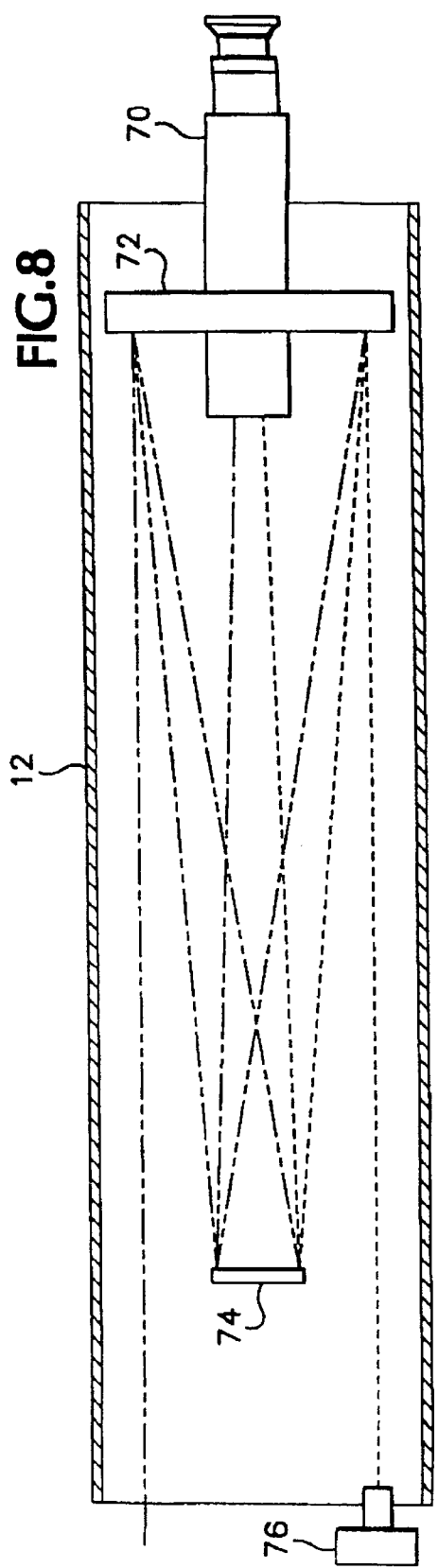

TELESCOPE WITH AUXILIARY IMAGE GENERATOR

BACKGROUND OF THE INVENTION

The following invention relates to a telescope having provision for injecting an auxiliary image into the focal plane of the telescope and more particularly for modifying a telescope in order to provide a projected image which may be superimposed over the image captured in the telescope's field of view.

In classical Newtonian and Cassegrainian telescopes, there is a shadow in the center of the telescope due to light which is vignetted or obstructed by the telescope's secondary mirror. This spot is a shadow that incoming light causes to fall on the primary mirror of the telescope. It therefore represents an unused portion of the aperture of the telescope.

In the past, systems have been proposed for injecting an image which can be a data image, such as a star map, into the field-of-view of the telescope. This image is injected into the telescope's field-of-view by beam-splitting mirrors, prisms and the like, and the image appears as one which is superimposed over the primary image gathered through the lens of the telescope.

The problem with such systems is that the beam-splitting mirrors or lenses reduce the intensity of the primary image and are complex to construct.

It would be very useful to be able to project data, such as the telescope's current position coordinates, as well as wide-angle graphics of the field-of-view at which the telescope is pointed, into the focal plane for viewing, in order to make the finding of other objects outside the field-of-view of the optical telescope easier.

BRIEF SUMMARY OF THE INVENTION

The present invention provides a telescope having a focal plane into which an image of a distant object is focused. It includes a primary mirror and a secondary mirror wherein the secondary mirror is positioned to cast a shadow on a portion of the primary mirror. A data image projecting device projects a data image from the portion of the primary mirror which lies in the shadow of the secondary mirror. The data image is focused in the focal plane of the telescope and is superimposed on the image of the distant object.

The data image projecting device may be located within an aperture formed in the primary mirror. In one form of the invention, an enclosure such as a tube extends through the aperture in the primary mirror. The tube has an electronic image screen at one end and a lens at an opposite end for projecting an image onto the secondary mirror.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a side cut-away schematic view showing the operation of the telescope of FIG. 1.

FIG. 6 is a side cut-away schematic view illustrating an alternative construction for the invention.

FIG. 7 is a side cut-away schematic view of another alternative embodiment of the invention.

FIG. 8 is a side cut-away schematic view of a telescope employing a Gregorian reflector and an image projection device.

DETAILED DESCRIPTION OF THE PREFERRED EMBODIMENT

Figure 1:
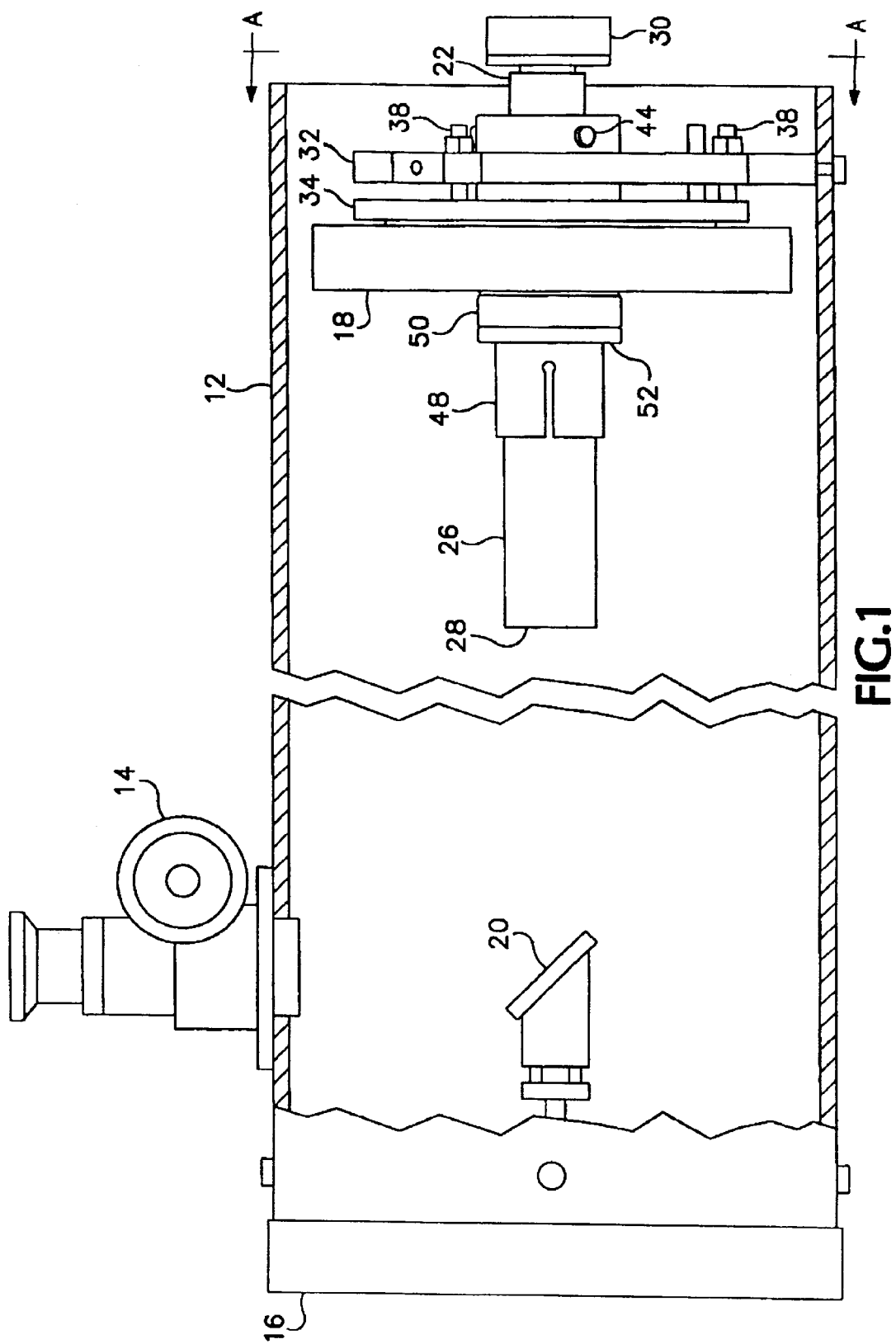
FIG. 1 is a side cut-away view of a Newtonian telescope employing the present invention.

Referring to FIGS. 1 and 5, a Newtonian telescope 10 includes a tubular housing 12 and an eyepiece 14. Light is collected through an input end 16 which may or may not include a lens (not shown). The light is reflected off of a primary mirror 18 at the opposite end of the housing 12. From there, the light is reflected off of a diagonal secondary mirror 20 and into the eyepiece 14. An image projection device 22 is journalled through an aperture in the primary mirror 18 and projects a data image (shown schematically by the dotted line 24 in FIG. 5) onto the secondary mirror 20 and from there confocally into the eyepiece 14. The image projection device 22 includes a tubular member 26 with a lens 28 at the projecting end and an electronic image display 30 at the opposite end.

Figure 2:
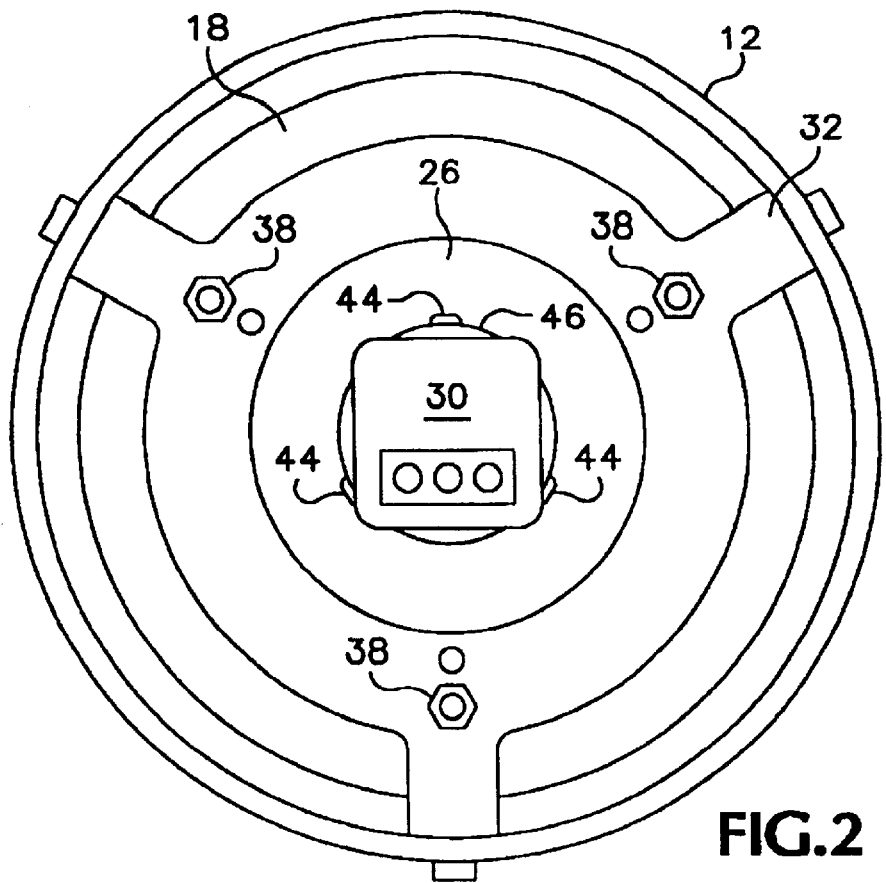
FIG. 2 is a rear view taken along line A—A of FIG. 1.
Figure 4:
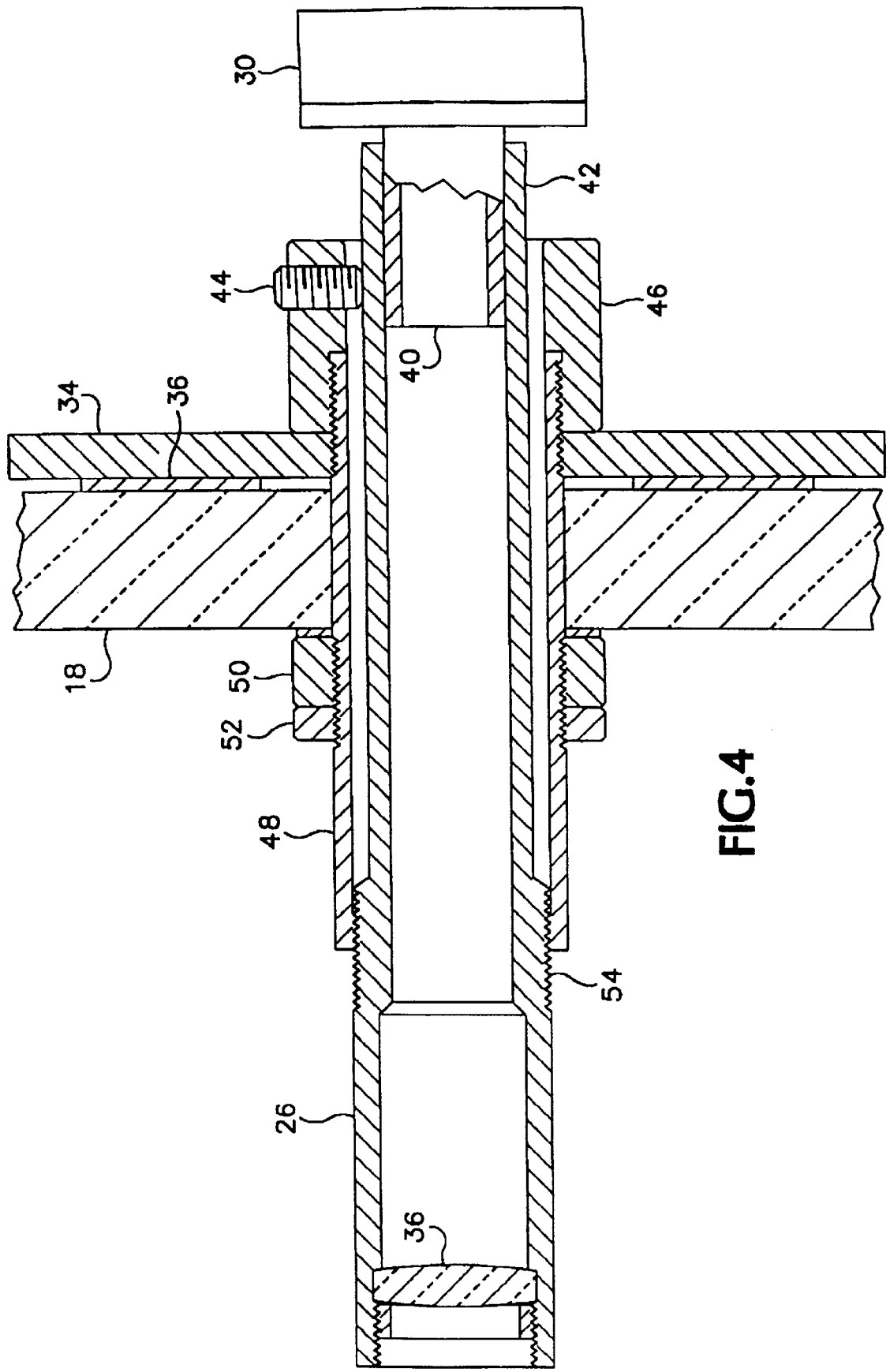
FIG. 4 is a partial side cut-away view of the primary mirror of the telescope of FIG. 1 having the image projection device threaded through an aperture therein.

Referring to FIGS. 2 and 4, a spider assembly 32 supports the mirror 18 and the projection device 22 within the tubular housing 12.

The primary mirror 18 is connected to the spider assembly by way of a backplate 34 which is supported by a cushion or pad 36. The backplate 34 is coupled to the spider assembly 32 by bolts 38. The display device 30 is mounted on a slip tube 40 which slides into a housing 42 for the image projection assembly. Three positioning screws 44 frictionally engage the housing 42, (only one is shown in FIG. 4). These screws 44 are used to align the tube 26 so that the image from the image display device 30 impinges directly on the diagonal mirror 20, and thereafter in the image plane of the eyepiece.

The support tube is constructed of a flexible material to provide some bend or "give" as the alignment screws 44 are adjusted to point the housing 42 at the secondary mirror 20.

The mirror backplate 34 is held in place by a backplate retainer 46 which is threaded and screws onto a support tube 48. The support tube 48 holds the mirror 18 by a mirror retainer 50 and a lock nut 52. Fine focus of the image projection device 22 is achieved through a series of threads 54 on the outside of the housing 26. The threads 54 engage similar threads on the inside of the support tube 48 and allow a lens 56 to focus an image from the image display device 30 onto the secondary mirror 20.

Figure 3:
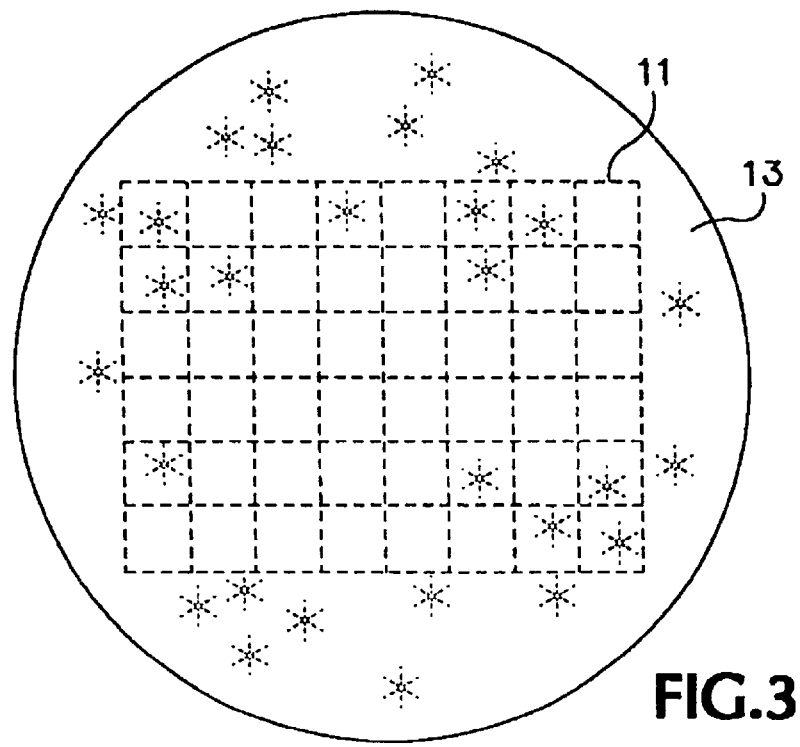
FIG. 3 is a representation of the image seen in the focal plane of the telescope of FIG. 1.

As illustrated in FIG. 3, a display image 11 is seen in the field of view of the primary display 13. In this case, the display image 11 is shown schematically. It is superimposed over the image collected through the lens of the telescope in actual use. The image 11 can be a map, grid, or a set of co-ordinates, or any other data or image that would be useful to the viewer.

Alternative embodiments of the invention are shown in FIGS. 6 through 11. In FIG. 6, an image projection device 50 is mounted on a support assembly 52. The image projection device 50 is disposed in front of the primary mirror 54 but is located in the portion of the mirror 54 that would normally be vignetted by the secondary mirror 56. The projection device 50 can be supported inside the enclosure 12 in any number of ways such as a spider assembly (not shown) which suspends the projection device in its proper position. Thus, the only difference between this embodiment and the embodiment of FIG. 5 is that the image projection device 50 is not journalled through the center of the mirror 54 as is the case with the embodiment of FIG. 5.

In FIG. 7, an image projection device 60 is journalled through an aperture in the housing 12 of the telescope to project an image against a diagonal mirror 62 that is located within the shadow of secondary mirror 64 that falls on the primary mirror 66. The mirror 62 can be supported inside the enclosure 12 in any number of ways such as by a spider assembly (not shown) which suspends the mirror in the proper position.

FIG. 8 shows a different type of telescope. According to FIG. 8, the telescope housing 12 includes an eyepiece 70 which is inserted through an aperture in a primary mirror 72, incoming light reflects off of the primary mirror 72 onto a secondary mirror 74 and thence to the eye piece 70. With this type of telescope, an image projection device 76 maybe clipped to the outside of the housing 12 so that its light enters the telescope along with the ambient light in the telescopes field of view, both the image gathered by the scope and the image projected by the projection device 76 are reflected off of the primary mirror 72 onto the secondary mirror 74 and thence to the eyepiece 70, where they are both superimposed to form a single image.

Figure 9:
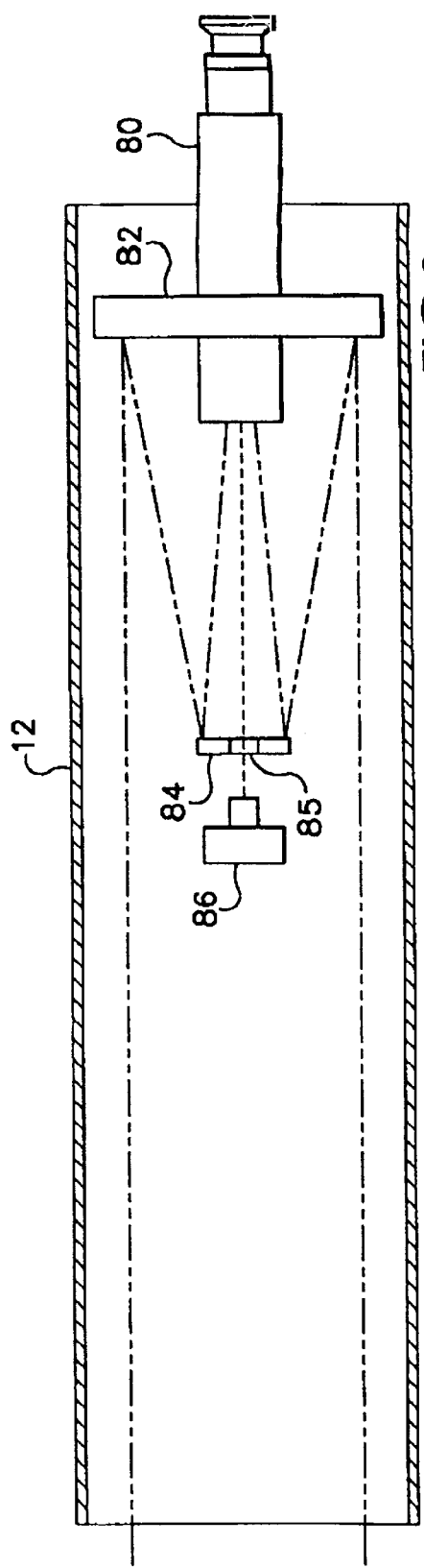
FIG. 9 is a side cut-away schematic view of a Cassegrain reflector telescope showing the image projection device aligned with an aperture in the secondary mirror.

A similar concept is illustrated in FIG. 9. A Cassegrainian telescope housing 12 includes an eyepiece 80 journalled through a primary mirror 82. A secondary mirror 84 includes an aperture 85. An image projection device 86 is inserted through the aperture 85 so as to produce an image at the eyepiece 80 which is coincident with the entering ambient light that is reflected off of mirrors 80 and 84.

Figure 10:
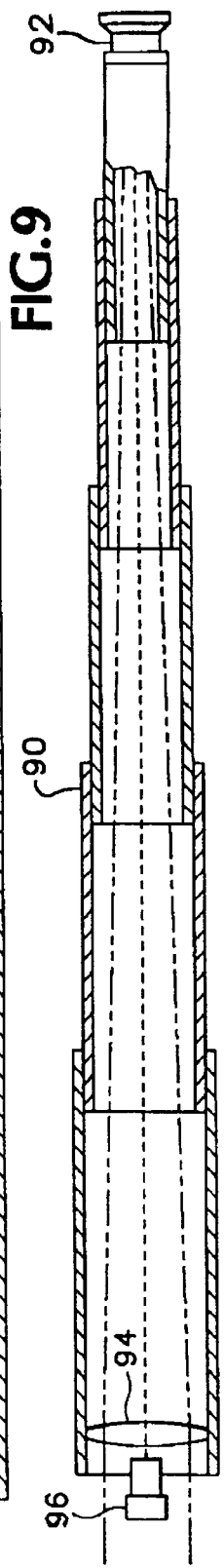
FIG. 10 is a partial side cut-away view of a refracting telescope having an image projection device aligned in the center of the input lens.

Yet another embodiment is shown in FIG. 10, in which a telescope 90 includes an eyepiece 92 and a magnifying lense 94, an image projection device 96 is clipped to the outside of the telescope 90 and projects an image through the lense 94, which along with the ambient light, gathered by the telescope, is focused by the lense 94 onto the eyepiece 92 to form a single image.

Figure 11:
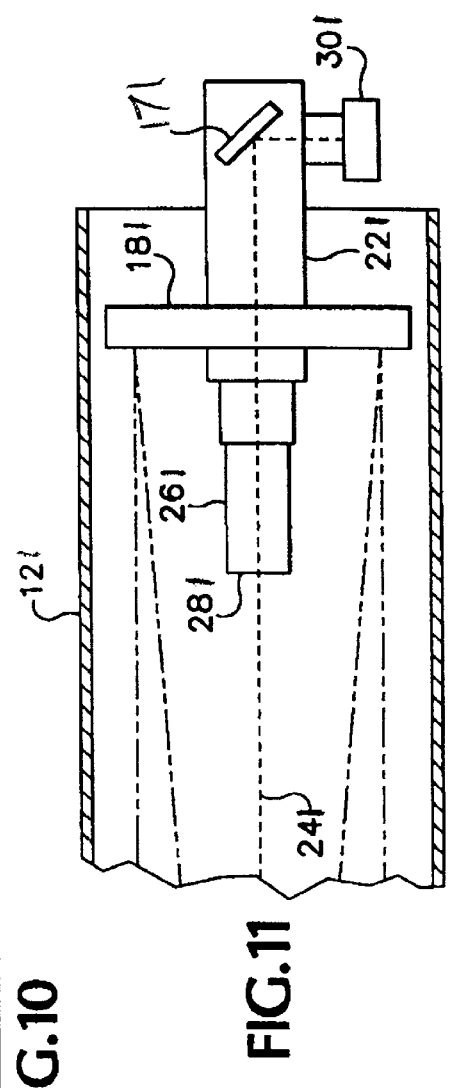
FIG. 11 is a partial side cut-away view of an alternative con construction of the telescope of FIGS. 1–3 showing an image reversing reflecting mirror interposed in the path of the image projection device.

If desired, a variation of the invention illustrated in FIGS. 1–3 may be employed. In FIG. 11, a diagonal mirror 171 has been inserted into the path of image display device 301. Thus, the image projection device 221 which is journalled through primary mirror 181 projects an image along a line 241 which is inverted (right to left). In this way, the data image is corrected for the right to left reversal that would otherwise occur with the embodiment of FIGS. 1–3. In all other respects this embodiment is identical to the embodiment of FIGS. 1–3 and includes a housing 121 containing the image projection device 221 and its associated lens 281 and tubular member 261.

The image projection devices used in the embodiments described above, and in particular, electronic display device 30, may take various forms. The preferred form of the device includes a miniature LCD display which accepts NTSE composite video. The electronic screen may include an eyepiece. A one-quarter inch display of this type suitable for this application is available from Kopin Corporation of Massachusetts. Another display, which is a miniature 12 millimeter monitor having a magnifying eyepiece, is available from Colorado Micro Display. Miniature thin film electroluminescent screens which display composite video and are of the type used in "Heads Up" displays, are available from Planar Systems, Inc. of Beaverton, Oreg.

Thus in its broadest sense, the invention is an improvement for telescopes whether they be of the Newtonian, Gregorian or Cassegrainian reflecting or refracting type that provides an image projection device for focusing a data image into the focal plane of the eyepiece of the telescope. The image projection device, which may include a tubular projector having an electronic imaging screen driven by a video card or the like at one end of the tube and a lens at the other end of the tube, is positioned either within the telescope or affixed to the outside of the telescope so as to project light which is coincident and essentially parallel to the light within the telescope's field-of-view. In this way, both the ambient image within the field-of-view and the data image provided by the video projection device are collected by the mirror or lens arrangement within the telescope and focused as superimposed images in the focal plane of the eyepiece.

It will be appreciated that there are many variations of the embodiments shown above which could be incorporated into a telescope either as part of original equipment or retrofitted. Virtually any physical arrangement which would permit a data image projector to insert its image into the lens and/or mirror collection apparatus of the telescope may be employed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A telescope including a housing and having a focal plane into which an image of a distant object is focused and including a primary mirror and a secondary mirror, wherein the secondary mirror is positioned within said housing to cause a shadow on a portion of the primary mirror, a data image projecting device projecting a data image from said portion of the primary mirror in the shadow of the secondary mirror, the data image being focused in said focal plane and superimposed upon the image of the distant object.

2. The telescope of claim 1 wherein said data image projecting device is positioned within an aperture in said primary mirror.

3. The telescope of claim 2 wherein said data image projecting device comprises an enclosure extending through said aperture and having an electronic image screen at a first end of said enclosure and a lens at an opposite end of said enclosure.

4. The telescope of claim 3 wherein said enclosure is held within a support tube capable of flexing so as to allow said enclosure to be aimed at said secondary mirror.

5. The telescope of claim 4, further including a spider assembly for mounting said primary mirror within said housing and a plurality of adjustment screws bearing against said enclosure to align said image projection device with said secondary mirror.

6. The telescope of claim 1 or 2 wherein said electronic image screen is an LCD video screen.

7. The telescope of claim 1 wherein said image projecting device is suspended within said telescope by a spider assembly aligned with the secondary mirror.

8. The telescope of claim 1 further including an image reversing mirror interposed into a path of said data image.

9. In a telescope having a field of view and means for focusing images in the field of view into the focal plane of an eyepiece, the improvement comprising data image projection means affixed to the telescope for projecting a data image inside the telescope in parallel with light received by the telescope so as to be collected in the focal plane of the eyepiece as an image superimposed upon images in the field of view of the telescope wherein said telescope includes a primary mirror and a secondary mirror, the primary mirror being located at the rear of the telescope the secondary mirror being located adjacent a front light collection end of the telescope, wherein said image protection means is journalled through an aperture in said primary mirror and aligned to project said data image on said secondary mirror.

10. The improvement of claim 9 wherein said image projection means is suspended within said telescope on a spider assembly, the telescope including a primary mirror and a secondary mirror and the spider assembly orienting the image projection means such that it projects light onto the secondary mirror.

* * * * *